Sept. 18, 1956 C. W. SWAN 2,763,363
CONTROL UNIT FOR COMPOSING MACHINES
Filed Dec. 20, 1952 3 Sheets-Sheet 1

INVENTOR
CARL W. SWAN
BY Emery Robinson
ATTORNEY

Sept. 18, 1956 C. W. SWAN 2,763,363
CONTROL UNIT FOR COMPOSING MACHINES
Filed Dec. 20, 1952 3 Sheets-Sheet 2

INVENTOR
CARL W. SWAN
BY Emery Robinson
ATTORNEY

Sept. 18, 1956  C. W. SWAN  2,763,363
CONTROL UNIT FOR COMPOSING MACHINES
Filed Dec. 20, 1952  3 Sheets-Sheet 3
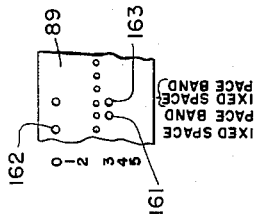
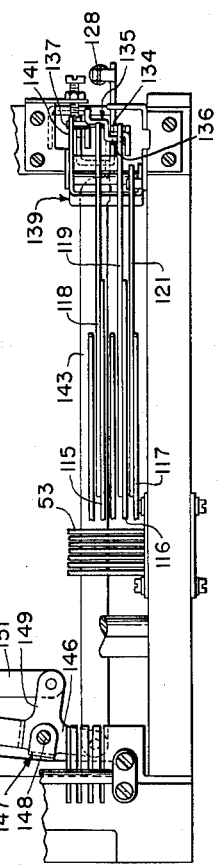
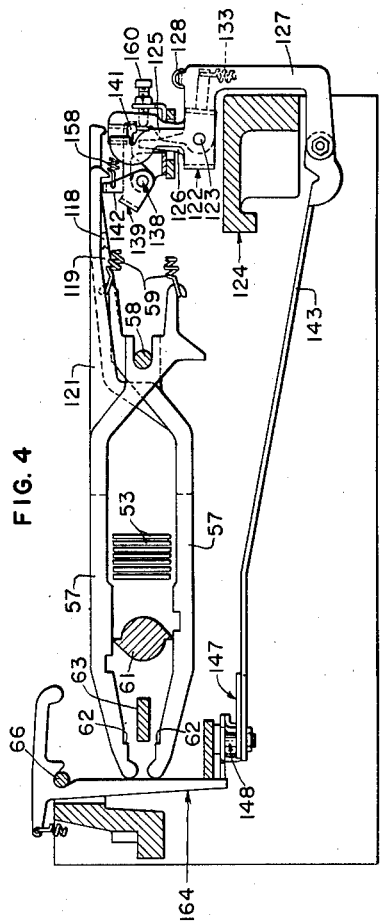
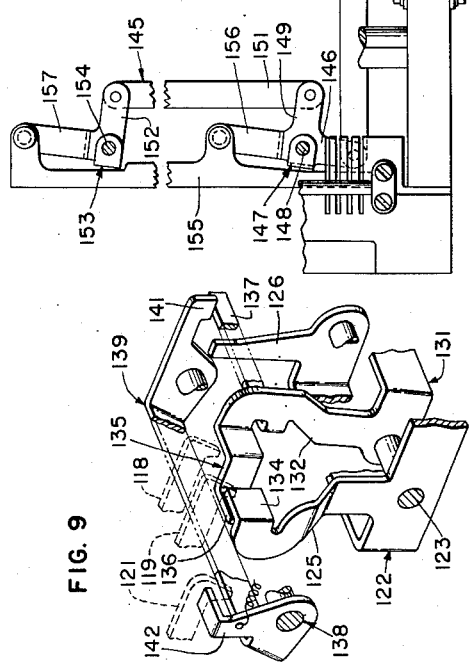
INVENTOR
CARL W. SWAN
BY Emery Robinson
ATTORNEY

United States Patent Office 2,763,363
Patented Sept. 18, 1956

2,763,363

CONTROL UNIT FOR COMPOSING MACHINES

Carl W. Swan, Skokie, Ill., assignor, by mesne assignments, to Teletypesetter Corporation, Chicago, Ill., a corporation of Delaware Application December 20, 1952, Serial No. 327,087

2 Claims. (Cl. 199—18)

This invention pertains to control mechanisms for linecasting and composing machines and more particularly to apparatus for effecting the selective response of such machines to stored signal conditions.

The primary object of the invention is to actuate concurrently a plurality of normally individually responsive instrumentalities in direct response to a stored signal.

Another object of the invention is to provide an apparatus for simultaneously controlling dual functions in response to a single code signal.

A further object of the invention is to provide a means for simultaneously effecting dual responses of a plurality of normally individually operative instrumentalities under the control of a single stored signal.

In the composition of material to be printed, it is the custom to finish all lines except certain short ones on a fixed right-hand margin. In composing machines of the linecasting type, this operation, called justification, is accomplished through the use of expansible spacebands to provide interword spaces. As a line is concluded, if the expansibility afforded by the included spacebands is sufficient to expand the line until it fills the required column width, the line is said to be justifiable. It may sometimes happen that a composed line which is short of justifiable length will not accommodate the next word or the next syllable of that word. The compositor may increase the length of the line by inserting fixed spaces, which are blank matrices of uniform thickness, adjacent the spacebands.

The subjection of linecasting and composing machines to automatic control, such as, for example, in the manner disclosed in Patent No. 2,091,286, granted August 31, 1937, to Howard L. Krum et al., may necessitate special treatment with reference to nonjustifiable lines. Automatic control units of the type disclosed in the patent of Howard L. Krum et al. may be controlled by perforated strips which may be produced by means of a keyboard perforator, such as the one disclosed in Patent No. 2,059,250 granted November 3, 1936 to Howard L. Krum. The counting of the matrix thicknesses and minimum and maximum spaceband values cumulatively is accomplished concurrently with the application of the signals to the strip representing the matrices and spacebands to be assembled. The deficiency of a line is discovered after the signals have been applied to the tape, but individual signals for the selection of fixed spaces cannot then be inserted conveniently because the already punched signals follow one another at closely spaced intervals. It has been a practice heretofore to render the series of signals representing a deficient line ineffective by rerunning the signals through the perforator and converting each to the so-called run-out or all-perforated signal. This series of ineffective signals is then followed by a reperforation of the signals representing the line to be composed, with the fixed space signals included at the desired points. The sensing of the idle signals, when the control strip is run through the control unit for the linecasting and composing machine, accomplishes no useful purpose and results in a period of idleness of the composing machine.

In accordance with the present invention, it is proposed to control automatically the release of fixed spaces to accompany a deficient line, without the insertion of signals particularly associated with the release of fixed space matrices, and by the modification of one or more of the spaceband signals in the line. The modification comprises the perforation of an additional code hole or holes whereby the ordinary spaceband signal is converted into an extraordinary spaceband signal. It may be accomplished by backspacing the control strip through the perforator until that one or those of the spaceband signals that are to be converted from the ordinary to the extraordinary spaceband signal are aligned with the punches, and depressing the key lever assigned to the execution of an extraordinary spaceband signal, or by inserting the additional perforation or perforations by means of a hand punch or by an auxiliary punch block in the keyboard perforator provided for that purpose. No other modification of the signals in the tape is required, and none of the signals in the deficient line is destroyed.

According to an additional feature of the invention, a means is provided whereby the record sensing and pull bar selecting apparatus will be conditioned, upon responding to an extraordinary spaceband signal, for releasing a fixed space matrix in response to each subsequent spaceband signal in a line whether such subsequent spaceband signal is the ordinary spaceband signal or has been converted to the extraordinary signal. In other words, the mechanism will automatically add a fixed space to each succeeding spaceband for the remainder of the line, although the tape reader senses only a spaceband signal. At the end of the line the elevator mechanism will unlatch the added fixed space mechanism permitting the unit to return to normal for the next line.

A full and complete understanding of the invention may be had by reference to the following description considered in the light of the accompanying drawings, in which:

Fig. 4 is a fragmental cross-sectional view of the operating unit embodying the present invention;

Fig. 5 is a partial top view of the arrangement shown in Fig. 4;

Fig. 8 is a plan view of a fragment of control tape containing signals for releasing a spaceband alone, a fixed space matrix alone, and for releasing both sequentially; and Fig. 9 is a perspective representation of the rear view shown in Fig. 7.

Figure 1:
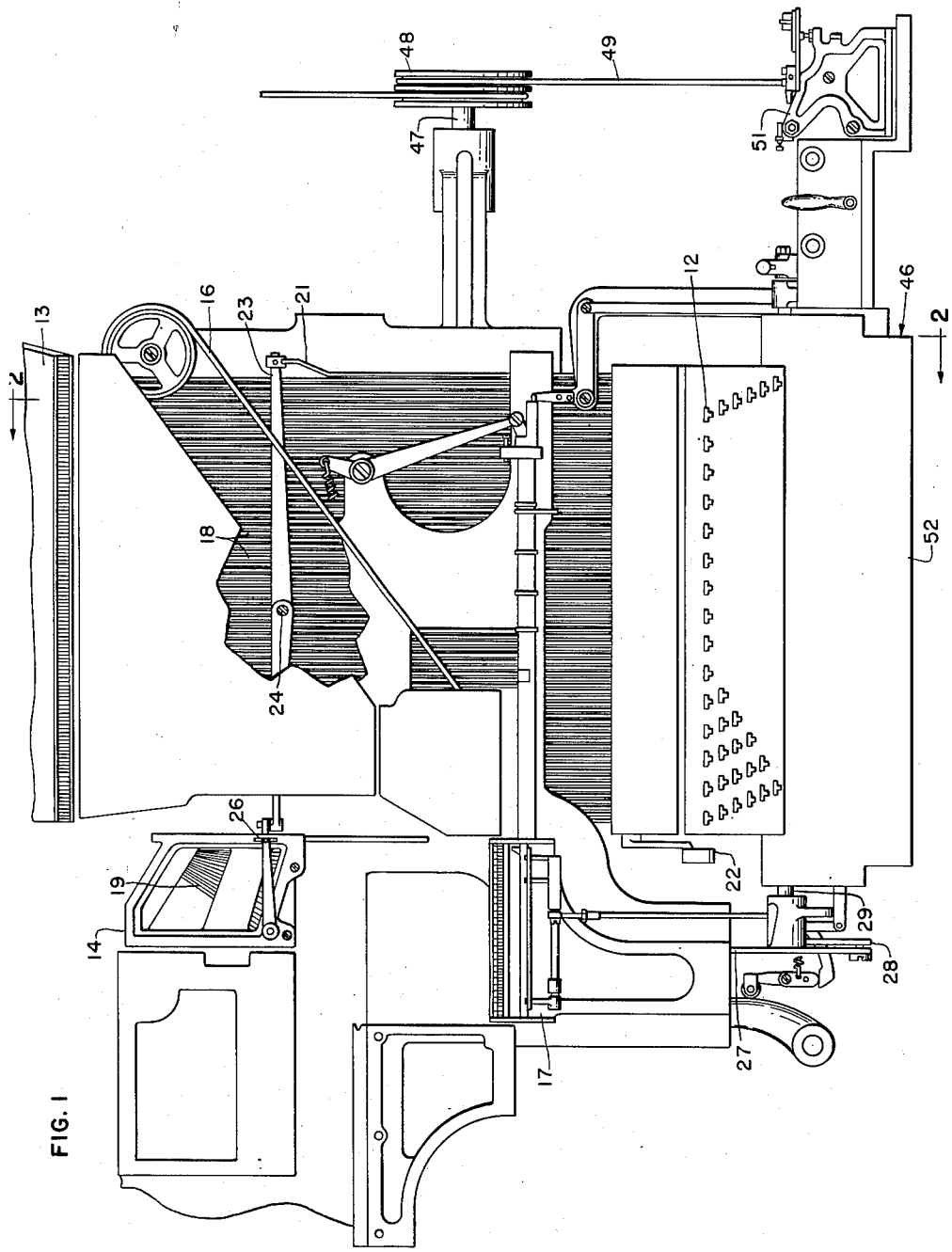
Fig. 1 is a front elevational view of a portion of a linecasting and composing machine having an automatic control unit applied thereto.
Figure 6:
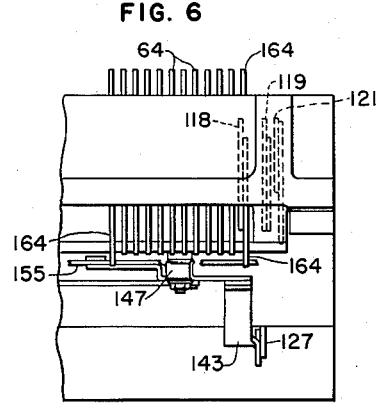
Fig. 6 is a fragmental front elevational view of the portion shown in Fig. 4.
Figure 7:
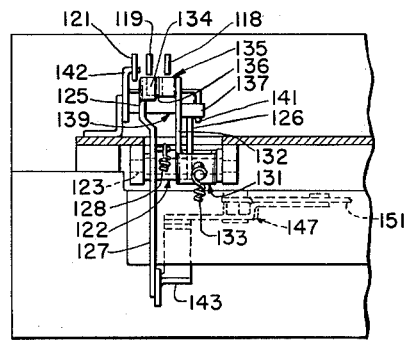
Fig. 7 is a fragmental rear view of the portion shown in Fig. 4.

Referring now to Fig. 1, the reference numeral 11 indicates generally a linecasting and composing machine. The linecasting machine has a conventional keyboard mechanism 12, matrix storage magazine 13, spaceband storage magazine 14, assembler belt 16, and an assembler elevator 17. The release of matrices from the matrix storage magazine 13 is effected by the lifting of release reeds 18, which may, if desired, be controlled from the keyboard 12, and the release of spacebands 19 from spaceband storage magazine 14 may be effected by the lifting of a special release reed 21, which may, if desired, be controlled by a manually operable spaceband key lever 22. A lever 23 pivoted intermediate its ends, as at 24, has one end connected to the spaceband release reed 21, and has the other end connected to the spaceband escapement mechanism 26. The assembler elevator 17 has depending therefrom a link 27 which is articulated at its lower end to a crank arm 28 carried by a rock shaft 29.

Figure 2:
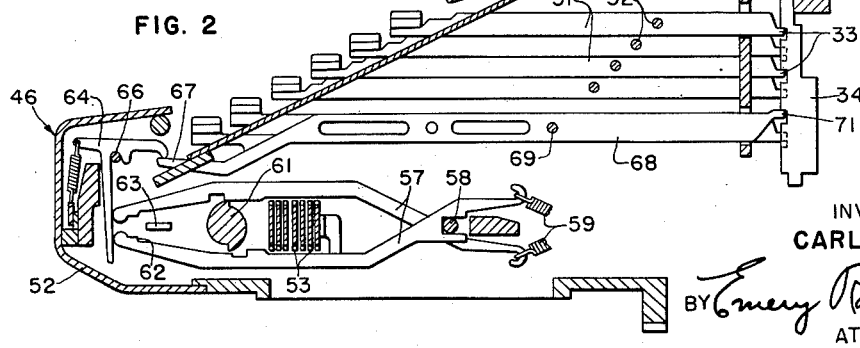
Fig. 2 is a vertical sectional view taken substantially on the line 2—2 of Fig. 1.

Fig. 2 shows the manner in which the release reeds are lifted to effect the release of a matrix or a spaceband. Referring to that figure, it will be noted that key levers 31 pivoted as at 32, have tongues 33 disposed in notches of individual weight bars 34, which are arranged to be lifted upon the rocking of a key lever 31 either manually or by automatic means. Each of the weight bars 34 is provided near its upper end with a notch in which is disposed one arm of a trigger bell crank 36, the other end of which normally supports a cam yoke 37 in such position that a keyboard cam 38, rotatably mounted in the cam yoke 37, is held out of engagement with a continuously rotating rubber roll 39. Each of the cam yokes 37 has a portion 41 disposed below a corresponding release reed 18 or 21. The release reeds 18 and 21 are notched to provide a shoulder which rests upon a supporting bar 42, and the notch permits lifting of the release reeds.

The lifting of a weight bar 34 by operation of a key lever 31 causes the rocking of the associated trigger bell crank 36 which frees the associated cam yoke 37 and permits it to drop until cam 38 engages rubber roll 39. Rotation is imparted to a cam 38 by rubber roll 39 which causes cam yoke 37 to be rocked counterclockwise (as viewed in Fig. 2) to lift the associated release reed 18 or 21. The lifting of cam yoke 37 by cam 38, returns it to the normal position where it is supported by trigger bell crank 36 in readiness for the next operation of the associated key lever 31 and weight bar 34.

Above each of the release reeds 18 there is a lever arm 43 pivoted as at 44 and having its free end adjacent to and in operative alignment with the escapement mechanism of a matrix storage channel of magazine 13 in well known manner. The lifting of one of the release reeds 18 causes its associated lever arm 43 to be rocked in clockwise direction (as viewed in Fig. 2) about its pivotal mounting 44 to cause its associated escapement mechanism to be operated and a matrix thereby released for transportation by assembler belt 16 to assembler elevator 17.

The present invention contemplates the operation of the keyboard mechanism 12 (Fig. 1) and of other instrumentalities of the linecasting machine, of which the assembler elevator 17, operable from the rock shaft 29, is an example, under the control of an automatic control unit which is indicated generally by the reference numeral 46, and which may be constructed in accordance with the teachings of the hereinbefore mentioned patent of Howard L. Krum et al. The automatic control unit 46 is attached to the linecasting machine 11 below and forward of the keyboard mechanism 12, and is arranged to be driven by power derived from any convenient continuously rotatable power shaft of the linecasting machine, such as the intermediate shaft 47 (Fig. 1). The power take-off for driving the automatic control unit may be a pulley 48 mounted on the intermediate shaft 47. Pulley 48 drives a belt 49 which engages a pulley (not shown) included in the record sensing mechanism indicated generally by the reference numeral 51 (Fig. 1).

Figure 3:
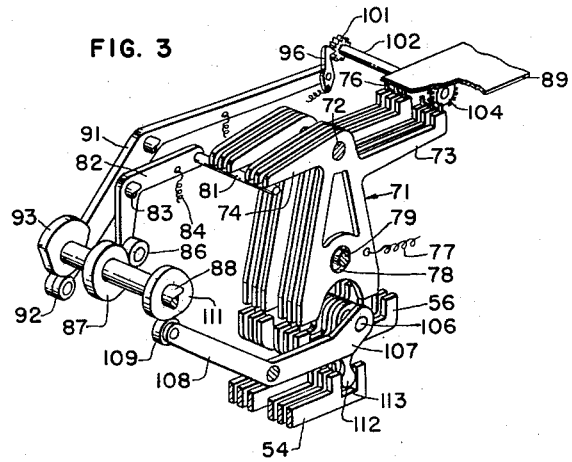
Fig. 3 is a perspective view of the record sensing mechanism.

The record sensing unit 51 controls a selecting unit which is contained within the housing 52 (Fig. 1) and the structural details of which are shown in Fig. 2. The selecting unit comprises code bars 53 to which permutational settings in accordance with the signal conditions sensed by the record sensing mechanism 51 are transmitted. Permutation code bars 53 are flat bars placed side-by-side and mounted for individual endwise movement between two selective positions. Connecting bars, or code bar extensions 54, engage each of the code bars 53 and extend into the record sensing unit 51 where they are articulated to the transfer levers 56 (Fig. 3). Code bars 53 are permutationally notched along the upper and lower edges, so that for each permutational setting of the code bars there may be established an alignment of notches extending across the entire permutation unit, which alignment may be in the upper or lower edges of the code bars 53. Selectable bars 57 extend transversely of the code bars 53 and are alternately disposed above and below the code bars. As shown in Fig. 2, each of the selectable bars 57 is fitted to a supporting bar 58 by means of notches, and springs 59 urge the selectable bars 57 rightwardly (as viewed in Fig. 2) to seat the selectable bars upon rod 58. Springs 59 also bias those selectable bars which extend below the code bars 53 clockwise, and those which extend above the code bars counterclockwise, whereby the selectable bars are urged to rotate into engagement with the code bars, and when permitted to rotate by the stripper or spreader cam 61, they move into engagement with the code bars and that selectable bar 57, which finds an alignment of notches, rotates farther than do the other selectable bars and enters the alignment of notches.

Each of the selectable bars 57 is provided on the edge which is adjacent to the code bars 53 and near its forward end (left end, as viewed in Fig. 2) with a shoulder 62 which is presented in the path of universal bail 63 upon selection of the selectable bar 57 by entrance of that bar into an alignment of notches. Universal bail 63 is shown in its normal or unoperated position in Fig. 2, and when it is actuated by the shaft which carries spreader cam 61, it is moved leftwardly (as viewed in Fig. 2) and engages the shoulder 62 of any selectable bar 57 which has been selected, and imparts endwise movement leftwardly to that bar.

Each of the selectable bars 57 which is assigned to the release of a matrix or a spaceband has in alignment with it the depending arm of a bell crank lever 64 which is pivoted on mounting shaft 66. The horizontal arm of each of the bell cranks 64 is disposed above and substantially in engagement with a forwardly extending portion 67 of an auxiliary key lever 68 pivoted on common pivot 69. There is an auxiliary key lever 68 for and below each of the manually operable key levers 31, and each of the key levers 68 has a tongue 71 which is disposed in a notch in one of the weight bars 34. It will be apparent from this that any one of the weight bars may be lifted to trip the associated cam yoke 37 by depressing the forward end of the associated key lever 31, or by depressing the foremost portion 67 of the associated auxiliary key lever 68. It will also be apparent that leftward movement of a selected one of the pull bars 57 by universal bail 63 will cause clockwise rocking of the associated crank lever 64, which will depress the forward end of its associated auxiliary key lever 68 to lift the corresponding weight bar 34. The patent of Howard L. Krum et al., hereinbefore identified, may be consulted for a fully detailed description and showing of the apparatus thus far described.

Referring now to Fig. 3, the reference numeral 71 indicates tape sensing levers rockably mounted upon pivot rod 72. Levers 71 have oppositely extending arms 73 and 74, the former of which are provided at their outer ends with upstanding tape sensing pins 76. Tape sensing levers 71 are biased in counterclockwise direction, as viewed in Fig. 3, by springs 77, and are provided in the body portions thereof with circular apertures 78 through which extends a fixed rod 79 to limit the movement of levers 71. Arms 74 of the tape sensing levers 71 are presented in the operating path of a bail 81 carried by bell crank 82 which is rockably mounted upon pivot rod 83. Bell crank 82 is biased in clockwise direction by tension spring 84 and is provided with a roller 86 which engages a cam 87 carried by record reader shaft 88. As shaft 88 rotates, cam 87 rocks the bell crank 82 in counterclockwise direction, and through bail 81 rocks tape sensing levers 71 in clockwise direction to withdraw tape sensing pins 76 from record tape 89 preparatory to advancement of the tape. Following withdrawal of the tape sensing pins 76, cam 87 permits bell crank 82 to return to its extreme clockwise position, thus lowering bail 81 and permitting those of the tape sensing levers 71, the sensing pins 76 of which find perforations in the tape to be rocked in counterclockwise direction to sense the signal combination in the tape.

Pivot rod 72 has mounted thereon a tape feed lever 91 which carries a roller 92 which engages the periphery of a tape feed cam 93 carried by record reader shaft 88. Tape feed lever 91 carries at its right-hand end, as viewed in Fig. 3, a tape feed pawl 96, which cooperates with a tape feed ratchet 101. Tape feed shaft 102 has secured thereto a sprocket 104 which engages feed holes in tape 89 for imparting movement to the tape relative to the sensing position determined by the location of sensing pins 76.

When tape sensing levers 71 are released by bail 81 to sense the tape 89, those of the sensing levers 71, the sensing pins 76 of which encounter perforations in the tape are rocked by their springs 77 to their extreme counterclockwise or selected positions. The remaining tape sensing levers 71 are held in their clockwise or unselected positions by unperforated portions of the tape. Below the tape sensing levers 71, transfer levers 56, previously identified, are pivotally supported by a rod 106 carried by transfer bail 107. The tape sensing levers terminate at their lower ends in the spaced prongs, and below each is one of the T-shaped transfer levers 56. The laterally extending arms of T-shaped transfer levers 56 have upstanding abutments spaced apart a greater distance than the distance between the depending prongs on the sensing levers. The spacing of the abutments is such that when a tape sensing lever is presented in its extreme clockwise position, which occurs when its tape sensing pin encounters an unperforated portion of the tape, the left-hand prong of the tape sensing lever will be presented in alignment with and in the path of the left-hand abutment of the associated transfer lever. Conversely, when a tape sensing lever 71 is presented in its extreme counterclockwise position, which condition exists when its tape sensing pin encounters and projects through a perforation in the tape, the right-hand prong of the tape sensing lever is presented in alignment with and in the path of the right-hand abutment of the associated transfer lever 56.

Bail 107 has connected thereto an operating lever arm 108 which has at its free end a roller 109 engaging the periphery of an operating cam 111 carried by record reader shaft 88. As cam 111 is rotated, it rocks lever arm 108 and, therefore, bail 107 in counterclockwise direction and thus elevates T-shaped transfer levers 56 with respect to the tape sensing levers 71. The distance through which transfer levers 56 are lifted exceeds that required to bring one of the abutments of each of the transfer levers 56 into engagement with one of the prongs of those of the tape sensing levers 71 which have been set under the control of a signal combination in the tape in positions different from those in which they were presented according to the preceding signal combination. Thus, a transfer lever 56, upon coming into engagement with a prong of a tape sensing lever 71, before the transfer lever reaches its limit of travel, will be rocked clockwise, or counterclockwise, about the rod 106, depending upon the position in which the tape sensing lever is presented. It will be evident from this that when the tape sensing levers have been set in accordance with a signal combination in the tape, and the transfer bail 107 has been operated, the T-shaped transfer levers will be set in extreme clockwise or counterclockwise positions in accordance with the signal combination in the tape.

The intermediate or vertical depending arms of the transfer levers 56 are formed at their lower extremities with disc-like portions 112. These disc-like portions are disposed in parallel sided notches 113 formed in the upper edges of link bars or extensions 54 of code bars 53. Thus, as each of the T-shaped transfer levers 56 is set in its extreme clockwise position under the control of its tape sensing lever 71, the code bar extension 54 and code bar 53 articulated to it are set in extreme left-hand position. Conversely, each of the transfer levers 56 that is rocked to extreme counterclockwise position effects the presentation of its associated code bar 53 and extension or link bar 54 in extreme right-hand position. The disc-like portions 112 of the transfer levers 56, and the notches 113 of the code bar extension 54 are so proportioned that the disc-like portions 112 are not lifted out of the notches 113 when the transfer levers 56 travel upwardly due to the operation of the transfer bail 107.

As set forth in the beginning of this description, the primary purpose of the invention is to effect the simultaneous or concurrent release of a fixed space matrix and a spaceband in response to a spaceband signal when the compositional conditions require the extra spacing. In Figs. 4 to 7 is shown a preferred embodiment of the present invention, wherein the simultaneous selection and operation of a fixed space and spaceband is effected by means of a parallelogram device selectively actuated in response to a special signal combination hereinafter referred to as the add-fixed-space code combination (which is formed by superimposing a spaceband signal and a fixed-space signal, as illustrated in Fig. 8), as well as to subsequent spaceband signals after being initially conditioned by said add-fixed-space signal.

Having reference to Figs. 4 and 5, certain of the selector bars 57, namely, bars 115, 116 and 117 (Fig. 5) are provided with rearwardly (rightward as shown in Figs. 4 and 5) directed hook portions 118, 119 and 121, respectively. A bail member 122 is mounted pivotally on a pivot shaft 123 suitably journalled in the frame of the unit 12 contained in housing 52, and is positioned beneath and in operative relation with the hooked extremities of the extensions 118, 119 and 121. To afford a stable support on shaft 123, the bail member 122 is of substantially U-shaped construction to provide a double bearing thereon. Moreover, bail member 122 is provided with upstanding arms 125 and 126, and a depending arm 127. Bail member 122 normally tends to rotate in a clockwise direction (as viewed in Fig. 4) under the influence of a spring 128. Also mounted pivotally on shaft 123 is a bail member 131 which, like bail member 122, is of U-shaped conformation to provide a double bearing on shaft 123. Bail member 131 is provided with an upstanding arm 132, and normally tends to rotate in a clockwise direction (as viewed in Fig. 4) under the influence of spring 133. Arm 125 of bail 122 is provided at its extremity with an inwardly and laterally directed projection 134. Arm 132 of bail 131 is provided at its extremity with a laterally directed substantially Z-shaped projection 135, the outer flange 136 of which is adapted to overlap the projection 134 of bail 122, as most clearly illustrated in Fig. 9. The purpose of this Z-shaped conformation of projection 135 will hereinafter appear. Arm 132 of bail 131 is also provided with a lateral projection 137, which is oppositely disposed to projection 135 and located between the projection 135 and the pivot shaft 123, as more clearly shown in Figs. 7 and 9.

Referring to Fig. 4, there is pivotally mounted on a pivot shaft 138 appropriately situated relative to bails 122 and 131, a latching bail 139 of U-shaped construction to afford a double bearing on shaft 138. Bail 139 is provided with an arm 141 terminating in a hook portion adapted to have latching relation with lateral projection 137 of bail 131. Bail 139 is also provided with a vertical arm 142 which terminates in a laterally directed portion adapted to cooperate with the hooked end of portion 121 of selector bar 117.

Depending arm 127 of bail 122 is pivotally articulated at its extremity to a link 143 which is operatively associated with a parallelogram device, indicated generally as 145. As illustrated in Fig. 5, link 143 is pivotally connected to arm 146 of a T-lever 147 mounted pivotally on a pivot stud 148 fixed to the frame of the control unit 46. Arm 149 of T-lever 147 is pivotally connected to one end of a link 151, the opposite end of which is connected pivotally to one arm 152 of a bell crank lever 153 mounted pivotally on a stud 154 secured to the frame 46. A blade 155 of the parallelogram device 145 is connected pivotally to arm 156 of T-lever 147 and to arm 157 of bell crank lever 153 in parallel motion manner. The blade 155 of the parallelogram device 145 cooperates with certain special bell crank levers 164 in which the depending arms have been extended or lengthened beyond the standard length shown in Fig. 2; for example, the bell crank 164 shown in Figs. 4 and 6, such that said certain special bell cranks may be dually controlled or operated; that is, either by the universal bail 63, or under certain predetermined conditions by the parallelogram device 145. Thus, for the purpose of the present disclosure, the bell crank levers 64 are deemed to have normal and special facilities, wherein the former refers to the normal length of the depending arm, and the latter refers to the longer or extended depending arm of certain of the bell cranks 164 to facilitate cooperation with the parallelogram device 145.

Tape for controlling the apparatus shown in Figs. 1 to 7, inclusive, may be prepared in a keyboard perforator, such as that shown in Patent No. 2,059,250, granted November 3, 1936, to H. L. Krum. Signals representing matrices and spacebands are perforated in the tape successively in proper order, and when the counting mechanism of the perforator indicates that sufficient material has been composed to fill the column measure by expansion of the spacebands or that the next word or the first syllable of the next word is too long to be included in the line, even though the spacebands will not expand sufficiently to fill the column measure, the line is terminated by the perforation of an elevator signal which will cause the assembler elevator 17 to be operated to deliver the assembled line to the line delivery slide. Under the second condition outlined in the foregoing sentence, it is necessary to provide for the addition of fixed space matrices to be assembled adjacent to some or all of the spacebands. This may be accomplished by bringing back into registry with the punch pins in the perforator those of the spaceband signals representing spacebands with which fixed space matrices are to be assembled, and converting them from the ordinary spaceband signal indicated in Fig. 8 as a single perforation in the code element 3 position to an extraordinary spaceband signal by the addition of a perforation in the code element 0 position. When fixed space matrices are required as a regular part of the composition without reference to spacebands or the filling out of a deficient line, they are represented by a code having a single perforation in the code element 0 position. Thus, by combining the attributes of both the spaceband signal and the fixed space signal, both a spaceband and a fixed space will be selected simultaneously.

With the arrangement according to the present invention, means is provided whereby the selector apparatus will be conditioned, upon responding to the 0-3 or extraordinary spaceband signal, for releasing a fixed space matrix in response to each subsequent spaceband signal in a line whether such subsequent spaceband signal is the ordinary spaceband signal or has been converted to the extraordinary signal. In other words, in the practice of the invention, means is provided in a linecasting and composing machine for releasing spacebands and fixed spaces simultaneously in response to a predetermined code signal which comprises changing only the first spaceband signal in the line pursuant to which the mechanism will automatically add a fixed space to each succeeding spaceband for the remainder of the line, whereupon the elevator signal will restore the arrangement to normal condition. This result is accomplished by providing a parallelogram arrangement responsive to the add fixed space code signal to effect simultaneous operation of both of the special fixed space and spaceband bell cranks 164.

In the operation of the device according to the invention, it is assumed that the elements of the structure are in their normal unoperated positions, as shown in Figs. 2 to 7. Upon reading the tape 89 the selector levers 71 are set permutatively, whereafter the transfer T-levers 56 are actuated by the transfer bail 108 to transfer the selection to the links 54 which, because they are articulated to code bars 53, will set said code bars 53 correspondingly to produce an alignment of notches therein, so that when the spreader cam 61 is rocked counterclockwise, a selected one of the selector bars 57 will enter said alignment of notches to present its shoulder 62 in the path of the operating bail 63 so that upon the leftward movement of said bail 63 the selected bar 57 will be actuated leftwardly to rotate its associated bell crank 64 (or special bell crank 164, as will presently appear) clockwise to operate its associated key lever 68 to effect, through a weight 34 and reed 18, the selection of a matrix or spaceband, as the case may be.

Thus, in response to the spaceband (code element 3 position), which is the position 161 in Fig. 8, the selector bar 115 will be selected and the bell crank 164 will be operated to effect through its associated key lever, weight 34 and reed 21, the counterclockwise rocking of lever 23 about pivot 24, Fig. 1, to operate the spaceband escapement mechanism 26 (Fig. 1) to release a spaceband from the spaceband storage magazine 14. It will be noted that when the spaceband selector bar 115 is selected, its rearward extension 118 is actuated downwardly or clockwise, but its hooked end has no effect upon bail member 131 because it is unable at this time to engage the lateral portion 135 (as is apparent in Figs. 4 and 5, the hooked end is presented to the left or in front of the portion 135 and is therefore ineffective).

Now, in response to a fixed space signal (referred to also as the thin space signal) which is the position 162 in Fig. 8, exemplified by the code element 0 position, the selector bar 116 identified with the thin space position in the matrix storage magazine 13 will be selected and operated, so that though its associated key lever 68, weight 34 and reed 18, a thin space matrix (also called fixed space, because it may control the release of an "en space" or "em space" matrix) will be released to drop upon the assembler belt 16 and be conveyed to the assembler elevator 17.

As previously mentioned, it is desired to simultaneously select a spaceband and a fixed space matrix (called the add-fixed space function). In this event, the spaceband signal (code element 3 position) is changed to an add-fixed-space signal (code element 0-3 positions) exemplified by transverse row 163 in Fig. 8. Then, when selector bar 116 is selected in response to the 0-3 or add-fixed-space signal it rotates clockwise about the pivot shaft 58 so that the hook at the extremity of extension 119 is presented behind (or to the right, as viewed in Fig. 4) of the lateral surface 134 of bail member 122, and also the shoulder 62 of said bar 116 is raised and is presented in the path of the operating bail 63 such that when bail 63 is reciprocated, the pull bar or selector bar 57 that has been selected is actuated leftwardly, whereupon the hook on extension 119 engages the lateral portion 134 to impart counterclockwise rotation to bail member 122 about its pivot 123 (as viewed in Fig. 4).

Incidentally, it is pointed out here that there is no bell crank 64 or 164 associated with the add-fixed-space selector bar 116 because, upon the selection of bar 116 the parallelogram device is actuated to operate the fixed-space bell crank and the spaceband bell crank, which have been provided with longer-than normal downwardly extended arms adapted to engage the blade 155 of the parallelogram device 145. It is thus observed that the spaceband bell crank and the fixed-space bell crank (of the bell cranks 64) are dually controlled either by their respective selector bars (of the bars 57) or by the parallelogram device.

Bail 122 upon being thus rotated counterclockwise by the extension 119 of the add-fixed space bar 116, imparts rightward movement (as viewed in Figs. 4 and 5) to link 143 to operate the parallelogram device 145 to cause blade 155 to actuate the fixed-space and spaceband bell cranks 164 to effect the release of the fixed-space matrix and a spaceband simultaneously. Furthermore, bail 122 upon being thus rotated carries with it, by virtue of the coaction or engagement of lateral portion 134 of bail 122 with lateral portion 136, the bail 131. Bail 131 is thus rotated counterclockwise and becomes latched by the arm 141 of the latching bail 139, which is normally biased clockwise by its spring 158. Bail 131 is thus held in this second position while bail 122 is allowed to return to its initial or first position.

Now, upon each subsequent selective operation of the spaceband pull bar or selector bar 115, the hooked end of its extension 118 will be lowered behind the lateral portion 135 (that is, to the right thereof, as viewed in Fig. 4) of bail 131, so that upon the leftward movement of bar 115 by operating bar 63, the bail 131 will be rotated further in a counterclockwise direction to its most forward or third position, and while so rotating, the lateral portion 137 of bail 131 will engage the upstanding arm 126 of bail 122 to effect the corresponding counterclockwise rotation of bail 122 to actuate, through link 143, the parallelogram device 145 in the manner previously described, whereupon, a fixed-space-matrix and a spaceband will be released substantially simultaneously.

The arrangement according to this invention has the advantage of being able to operate any desired channel of the matrix storage magazine 13 in response to the add-fixed-space code signal without it becoming necessary to cut new code combinations in the code bars 53. It is therefort manifest, that in response to an add-fixed-space code signal, the mechanism described herein will be conditioned so that in response to each subsequent spaceband signal said mechanism will automatically add a fixed-space matrix to each succeeding spaceband for the remainder of the line, although the tape reader senses only a spaceband code signal.

In the preparation of tape for controlling the apparatus according to the present invention, it is not necessary to modify each spaceband signal in order to effect the release of a fixed-space matrix simultaneously therewith, but it is only necessary to modify one spaceband signal (to convert said ordinary spaceband signal into an extraordinary spaceband signal) in order to effect the release of a fixed-space matrix with that spaceband and with all following it in the line. As is disclosed in said Patent No. 2,091,286 to H. L. Krum et al., the matrices and spacebands are assembled in the assembly elevator 17 and upon receipt of the elevator signal at the end of the line, the elevator 17 is raised to carry the assembled line of matrices to a transfer mechanism which directs the line of matrices to the casting position in well known manner. Upon the sensing of the elevator signal in the tape 89 by the tape reader 51, the code bars 53 will be set permutably to effect the selection of the elevator selector bar 117 so that upon its movement leftwardly by the bar 63 in coaction with shoulder 62 of bar 117, the hooked end of the extension 121 of bar 117 will engage the vertical arm 142 of the latch bail 139 to cause said bail 139 to rotate counterclockwise to effect the disengagement of latch arm 141 thereof from the lateral portion 137 of bail member 131 to permit bail 131 to return to its clockwise or rightward position against a stop 160 under the pull of its spring 133. Thus it is observed that at the end of the line the elevator mechanism will unlatch the added-fixed-space mechanism, permitting said mechanism to return to normal for the next line.

Although a preferred form of the invention has been disclosed and described, it is obvious that changes may be made in the details set forth without departing from the essentials of the invention.

What is claimed is:

1. In a line casting and composing machine, means for releasing variable thickness space elements, means for releasing fixed thickness space elements, a pair of selectable members for controlling respective ones of said means individually, selecting means effective when responsive to predetermined different signals for selecting said pair of selectable elements individually, parallel-motion means comprising facilities for actuating said space element releasing means, a first bail member for controlling said parallel-motion means, a special selectable member for controlling said first bail member, a second bail member conditioned by said first bail member for operation, means for latching said conditioned second bail member, said selecting means effective when responsive to a signal including the attributes of both said predetermined signals for selecting said special selectable member to effectuate through said first bail member the operation of said parallel-motion means, whereby said parallel-motion means is effective upon both of said space element releasing means simultaneously, and means on said first bail member operably related to said second bail member and effective after said conditioning to effectuate the operation of said parallel-motion means upon all selective actuations of the one of said pair of selectable members controlling the releasing means for variable thickness space elements.

2. In a line casting and composing machine, means for releasing variable thickness space elements, means for releasing fixed thickness space elements, a pair of selectable members for controlling respective ones of said means individually, selecting means effective when responsive to predetermined different signals for selecting said pair of selectable elements individually, means for conveying an assembly of type composition elements and space elements, means for actuating said conveying means, parallel-motion means comprising facilities for actuating said space element releasing means, a first bail member for controlling said parallel-motion means, a special settable member for controlling said first bail member, a second bail member conditioned by said first bail member for operation, means for latching said conditioned second bail member, said selecting means effective when responsive to a signal including the attributes of both said predetermined signals for selecting said special selectable member to effectuate through said first bail member the operation of said parallel-motion means, whereby said parallel-motion means is effective upon both of said space element releasing means simultaneously, means on said first bail member operably related to said second bail member and effective after said conditioning to effectuate the operation of said parallel-motion means upon all selective actuations of the one of said pair of selectable members controlling the releasing means for variable thickness space elements, and means controlled by the actuating means for said conveying means for rendering said latching means ineffective.

References Cited in the file of this patent

UNITED STATES PATENTS

| | | |
|---|---|---|
| 1,840,408 | Pickett et al. | Jan. 12, 1932 |
| 1,964,850 | Hilpman | July 3, 1934 |
| 2,006,848 | Walden | July 2, 1935 |
| 2,090,654 | Walden | Aug. 24, 1937 |
| 2,102,127 | Potts | Dec. 14, 1937 |
| 2,117,474 | Goetz et al. | May 17, 1938 |